United States Patent [19]

Kilmer et al.

[11] 3,725,584

[45] Apr. 3, 1973

[54] ACOUSTIC COUPLER

[75] Inventors: Charlie C. Kilmer; Robert J. Orchard, both of Raleigh, N.C.

[73] Assignee: International Business Machines Corporation, Armonk, N.Y.

[22] Filed: Dec. 30, 1970

[21] Appl. No.: 102,572

[52] U.S. Cl. ....................179/1 C
[51] Int. Cl. ....................H04m 1/00
[58] Field of Search .179/1 C, 2 C, 6 AC, 5 P, 182 R, 179/182 A

[56] References Cited

UNITED STATES PATENTS

| | | | |
|---|---|---|---|
| 2,620,891 | 12/1952 | Heap | 179/182 A |
| 3,360,071 | 12/1967 | Vogelman | 179/1 C |
| 2,165,546 | 7/1939 | Heller | 179/1 C |
| 3,585,302 | 6/1971 | Swan | 179/1 C |
| 3,553,374 | 1/1971 | Wolf | 179/2 C |
| 3,449,522 | 6/1969 | Crane | 179/1 C |

FOREIGN PATENTS OR APPLICATIONS

| | | | |
|---|---|---|---|
| 1,013,279 | 2/1950 | France | 179/1 C |

*Primary Examiner*—Ralph D. Blakeslee
*Assistant Examiner*—Jon Bradford Leaheey
*Attorney*—Hanifin and Jancin and Carl W. Laumann, Jr.

[57] ABSTRACT

An acoustic coupler assembly for coupling a telephone handset to a terminal. The assembly contains a housing member of rubber having a plurality of soft foam washers which attach it to the base. The upper portion of the housing has an aperture which contains a tapered resilient sleeve having an inner diameter which corresponds to the outer dimension of a telephone handset. The sleeve is spaced from the wall of the housing so that it can accommodate the various shapes of handsets in use. A ridge at the base of the sleeve provides a limiting action and prevents the handset from being inserted too far.

7 Claims, 4 Drawing Figures

INVENTORS
CHARLIE C. KILMER
ROBERT J. ORCHARD

BY [signature]
ATTORNEY

ACOUSTIC COUPLER

BACKGROUND OF THE INVENTION

Acoustic couplers have come into common use for the purpose of coupling a terminal to a computer where the terminal is not in constant use or the distance is too great to permit a direct wire connection. These devices include a pair of transducers which coact with the telephone handset to transmit and receive the audio tones which convey the desired information. Since the signals on the telephone lines must be held to a low level to prevent undesirable effects such as crosstalk and overloaded amplifiers, the transducers must accurately couple the maximum acceptable level signal into and from the handset. It can be appreciated that the signal to noise ratio will be adversely affected if environmental noise is allowed to reach the transducer associated with the telephone receiving element. Similar adverse effects will occur if the background noise or vibration is allowed to reach the telephone transmitter. The problem is one of assuring that the maximum degree of coupling is achieved between the transducers and the handset while maintaining the maximum isolation of the transducer handset combination from the effects of environmental noise and vibration.

The problem has been recognized for some time and efforts have been made to provide an acceptable device. A common approach to the problem has been to provide a ring of sponge-like rubber or similar material to hold the handset in close proximity to the transducer. This version suffers from poor isolation from background noise and rather inefficient coupling between the handset and the transducer. Another device utilizes a soft, nonporous washer to provide a seal between the handset and the transducer. In this type of device it is only the weight of the handset which acts to compress the washer and the seal obtained is, therefore, very poor.

In addition to the lack of an adequate seal between the transducers and the handset, the prior art systems generally do not have adequate isolation for mechanical vibrations. In general, the systems have attempted to mechanically isolate the transducers by the use of foam padding on the base of the coupler. This approach is ineffective to provide the degree of isolation which is required.

SUMMARY OF THE INVENTION

The preferred embodiment of this invention achieves mechanical and acoustic isolation by a three-part structure. The basic housing or column is molded from a 50A durometer Neoprene rubber. The sleeve, which is preferably molded from a 30A durometer Neoprene, is designed to present a gradually narrowing recess for the insertion of the handset transmitter and receiver. A thickened ring portion at the base of the sleeve coacts with the column wall to limit the depth to which the handset can be inserted. This results in a more uniform volume of the space separating the transducers from the handset. While this dimension is not critical in all applications of acoustic couplers, it has been established that variations in phase shift between widely separated frequencies can be a problem when the volume of the space between the transducer and the handset is not held to reasonable tolerances from one terminal to another.

It is therefore an object of this invention to provide an improved acoustic coupler.

It is another object of the invention to provide an acoustic coupler having improved mechanical and acoustic isolation characteristics.

Still another object of the invention is to provide an improved acoustic seal for an acoustic coupler.

A still further object of the invention is to provide an acoustic coupler with desirable isolation characteristics that can accommodate handsets of different shapes without the need for adjustment.

Another object of the invention is to provide an acoustic seal which results in a relatively constant volume between a telephone handset and the transducers without a detrimental effect on the quality of the seal or the ease of use.

The foregoing and other objects, features and advantages of the invention will be apparent from the following more particular description of the preferred embodiment of the invention as illustrated in the accompanying drawings.

DESCRIPTION OF THE DRAWINGS

With reference to FIG. 1, the acoustic coupler includes a housing 10 and a transducer cover 11. A pair of sloping surfaces 12 and 13 contain openings 14 and 15 for the exterior portion of the resilient sleeve used to seal the telephone handset 16 to the transducer.

To place the unit in operation, the handset 16 is pushed firmly into the resilient sleeve which protrudes slightly from openings 14 and 15. The recessed area 17 provides clearance between surfaces 12 and 13 for the operator's hand when the handset is inserted or removed. There are no clamps, holders or cradles required to hold the handset in place.

Figure 1:
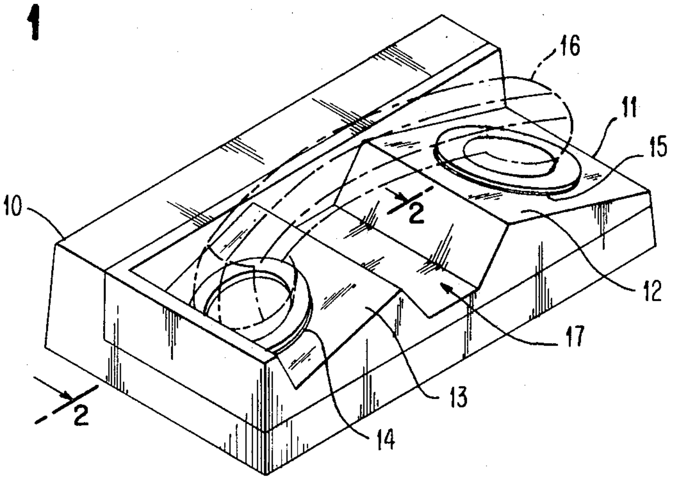
FIG. 1 is a representation of the acoustic coupler of this invention with the telephone handset in position for operation.
Figure 2:
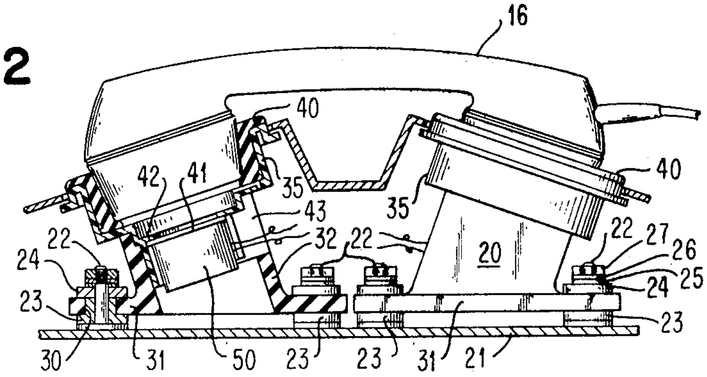
FIG. 2 is a partial sectional view taken along the line 2—2 of FIG. 1.
Figure 3:
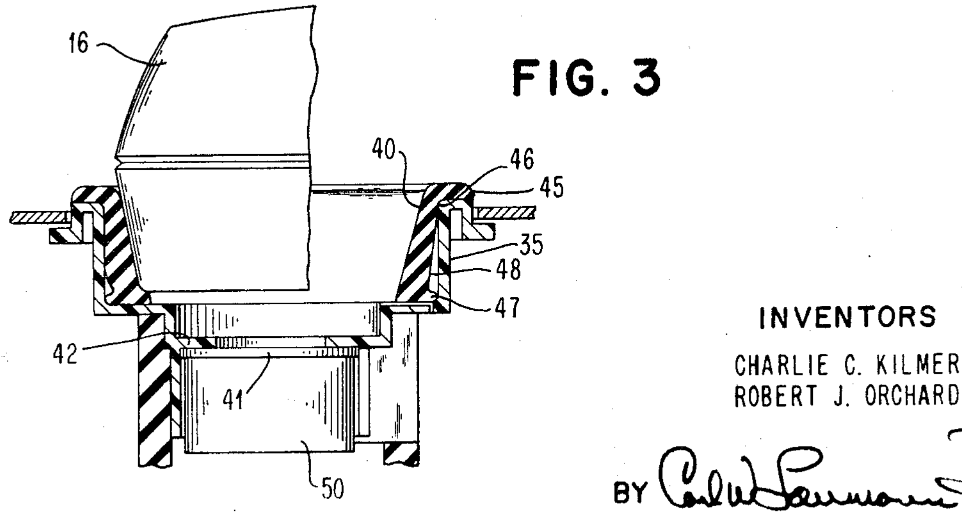
FIG. 3 is an enlarged sectional view of the tapered resilient sleeve which seals the handset to the transducer.
Figure 4:
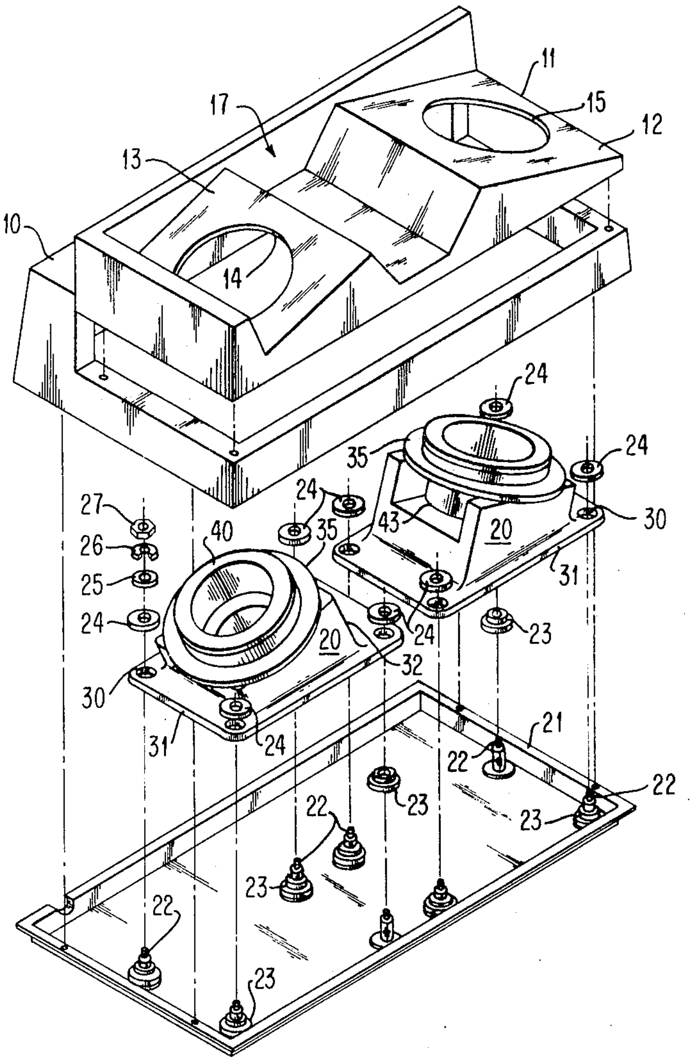
FIG. 4 is an exploded view of the acoustic coupler shown in FIG. 1.

The detailed structure of the acoustic coupler is shown in FIG. 2 and FIG. 4. The same reference characters refer to identical elements in these figures.

Fundamental support for the cover 10 and the acoustic column 20 is provided by a base 21. The base may be made from any suitable material since it does not contribute to the acoustic isolation. A preferred material for base 21, housing 10 and cover 11 is ABS material which may be easily formed or molded with conventional techniques.

The acoustic columns 20 are affixed to base 21 by means of shoulder studs 22 which are imbedded in the bottom portion of the base. Each shoulder stud has a foam isolator 23 and washer 24 to isolate column 20 from base 21. The isolator 23 and washer 24 are fabricated from a low density foam material such as 4 pounds per cubic foot urethane foam.

The isolator 23 and washer 24 are retained in place on shoulder stud 22 by means of flat washer 25, lock washer 26 and nut 27. The diameter of mounting holes 30 in acoustic columns 20 is slightly less than the diameter of flat washer 25 to securely retain the column. The relationship between the shoulder studs 22 and holes 30 is such as to provide space for an adequate amount of low density foam in the form of isolator 23.

Column 20 is also fabricated from a resilient material to provide further acoustic isolation. It must be sufficiently rigid to support the transducer in a relatively fixed position while allowing movement to accommodate the insertion of variously shaped handsets. A 50A durometer Neoprene rubber has been found satisfactory.

The column 20 has a lower, flange portion 31 which contains the mounting holes 30. A hollow pillar 32 rises from flange 31 at an angle corresponding to that of the telephone handset. Pillar 32 has a cylindrical interior to accommodate transducer and acoustic seal support member 35 which is fabricated from a relatively rigid material. Support member 35 has a generally cylindrical shape with a series of flanges and shoulders to accommodate and support the sleeve shaped acoustic seal 40 and the transducer 50, as well as provide for easy assembly into the cylindrical interior of pillar 32.

Each acoustic column 20 is provided with a transducer 50. The transducer associated with the transmitter portion of the handset is of the type which converts an electrical signal into an acoustic signal. The other transducer is effective to convert the acoustic signal from the handset receiver into an electrical signal.

The transducers are secured to support members 35 by cementing or bonding the transducer flange 41 to the bottom surface of shoulder 42.

Support members 35 are bonded or cemented in place within pillars 32. The configuration of the inner surface of pillars 32 is complementary to the corresponding portion of support member 35. A portion of pillars 32 facing the center of the assembly is cut away to form opening 43 to facilitate wiring of the transducers.

The upper portion of support member 35 is cylindrical in shape to accommodate acoustic seal 40. The configuration of seal 40 is such that contact with support member 35 exists only at the top and bottom of the two elements before the handset is inserted. An upper shoulder 45 is cemented to a corresponding surface of support member 35. This shoulder prevents the seal from being forced downward when the handset is inserted. The outside diameter of the seal 40 in the region 46 is essentially the same as the inside diameter of support member 35 at that point. The inner diameter of seal 40 in this area is approximately the same as the diameter of that portion of the inserted handset which engages the seal.

A lower shoulder 47 serves to space the outer wall 48 of the seal from the support member 35. This lower shoulder provides a dual function by supporting the wall of seal 40 away from the support member 35 and additionally providing a limiting function on the depth which the handset can be inserted into the seal.

The tapered wall of seal 40 is thinner at the top than it is at the bottom. As the handset is inserted, the upper wall is more easily deflected than the lower wall and therefore conforms closely to the handset regardless of the shape of the handset.

The lower portion of the wall is thicker and provides a progressively increasing force as the handset is inserted further into the cavity. This provides the tight contact which is essential to a good acoustic seal. The more flexible upper portion of the wall is effective to increase the area of contact between the handset and the seal 40 to improve the isolation of the transducer 50 from ambient noise. In addition to improved isolation, the improved seal increases the effective coupling between the handset and the transducers.

The limiting action on the depth of insertion of the handset results from the increased resistance of seal deflection provided by shoulder 47. The space between the wall of seal 40 and support member 35 accommodate the handset. However, in the region of shoulder 47, seal 40 is restrained from substantial outward deflection and thereby prevents the handset from being inserted too far into the coupler. Because the inner surface of wall 40 is a relatively straight conical surface, there is a more gradual limiting action than if there were a depth limiting shoulder on the inner surface.

This factor is significant in accommodating handsets of differing shapes. The wedging action used to limit the depth of insertion allows somewhat more latitude in the range of dimensions which are adequately sealed than an abutting stop would provide.

The need for an accurately reproducible volume defined by the abutting faces of the handset and transducer becomes more significant as higher frequencies are transmitted. Since the relative phase shift over the range of transmitted frequencies is dependent on the volume of this space, it is important that the volume be essentially the same each time the handset is inserted. If this is the case, circuits can be designed to compensate for the phase shift.

The acoustic seal is effective to accommodate differences in the shape of the housing of the handset transmitter and receiver and to a limited extent differences in the angular relationship and distance between the transmitter and receiver. There are some handsets which differ so much that full accommodation cannot be provided by seal 40 alone.

The flexible nature of column 20, particularly flange 31, allows the angle and distance between the columns 20 to vary sufficiently to provide an excellent seal without the need for individual adjustments or clamps to hold the handset in place. The foam isolators 23 and washers 24 also contribute to this accommodation.

While the invention has been particularly shown and described with reference to preferred embodiments thereof, it will be understood by those skilled in the art that various changes in form and details may be made therein without departing from the spirit and scope of the invention.

What is claimed is:

1. In an acoustic coupler for connecting a telephone handset to an electrical signalling device, an improved transducer mount comprising in combination:

an acoustic column, said column having a first flange portion and a second pillar portion with at least said first flange portion being fabricated from a resilient material;

support means on said pillar portion for supporting a transducer, said support means having a generally cylindrical shape and being affixed to said acoustic column and being fabricated from a rigid material and having an inside diameter sufficient to accommodate a telephone handset;

a resilient acoustic seal within said support means, said seal being of generally cylindrical shape and having first and second open ends, said first open end being larger than said second open end to permit insertion of a telephone handset, the wall of said seal being thicker near said second end than the wall of said seal near the first end thereof, said seal further having a shoulder about the outer periphery of said second end, said shoulder having an outer diameter approximately equal to the inner diameter of said support means; and means for securing said acoustic column to a base including a plurality of foam isolators.

2. A device according to claim 1 wherein said column is fabricated from a 50A durometer rubber material and said isolators are fabricated from 4 pounds per cubic foot urethane foam.

3. Apparatus as described in claim 1, wherein:

said acoustic column which is made of resilient material further provides a self-aligning function by flexing to adjust to different handset geometries.

4. A flexible acoustic seal for use in coupling a telephone handset to a transducer, said seal having a generally cylindrical shape with first and second open ends, said first end having an internal diameter greater than the internal diameter of said second end, the cylindrical wall of said seal having a greater thickness in the region of said second end than the thickness in the region of said first end, a shoulder about the outer periphery of said second end to space said wall of said seal away from its support in the area proximate to said shoulder and limit the depth to which a telephone handset can be inserted by creating a wedging action between the outer periphery of said handset and the inner periphery of said seal by the action of said wall against its support in the space between said wall and said support created by said shoulder.

5. A seal according to claim 4 wherein the cylindrical wall of said seal is a straight taper from said first end to said second end.

6. A seal according to claim 5 wherein the outer diameter of said shoulder is equal to the outer diameter of the wall of said first end.

7. A seal according to claim 6 further including:

a rigid support means for said seal, said support means having a cylindrical internal surface, the diameter of said cylindrical surface corresponding to the outer diameter of said shoulder.

* * * * *